United States Patent [19]

Kim

[11] Patent Number: 5,768,630
[45] Date of Patent: Jun. 16, 1998

[54] APPARATUS FOR RECEIVING AND TRANSMITTING A SERIAL DATA

[75] Inventor: Gye Su Kim, Kyungsangbook-Do, Rep. of Korea

[73] Assignee: LG Semicon Co., Ltd., Choongcheongbuk-do, Rep. of Korea

[21] Appl. No.: 720,869

[22] Filed: Oct. 3, 1996

[30] Foreign Application Priority Data

Oct. 6, 1995 [KR] Rep. of Korea ............ 1995/34268

[51] Int. Cl.6 ............................................. G06F 3/00
[52] U.S. Cl. ............... 395/891; 395/853; 395/872; 395/888; 371/55; 371/87
[58] Field of Search ................ 395/885–888, 395/891, 853, 872; 371/55, 87; 341/87; 345/507

[56] References Cited

U.S. PATENT DOCUMENTS

| 3,936,808 | 2/1976 | O'Neill, Jr. | 345/507 |
| 4,071,887 | 1/1978 | Daly et al. | 395/309 |
| 4,312,074 | 1/1982 | Pauder et al. | 375/343 |
| 5,151,903 | 9/1992 | Mudill et al. | 371/27.6 |
| 5,434,568 | 7/1995 | Moll | 341/87 |
| 5,600,316 | 2/1997 | Moll | 341/87 |

Primary Examiner—Christopher B. Shin

[57] ABSTRACT

A receiving and transmitting apparatus of a serial data has a transmission rate as fast as that of a communication apparatus of parallel data. The present invention compresses and transmits a serial data repeated in transmitting a serial data, and counts the repeating serial data. The present invention outputs the identical serial data at each counting to a host when receiving a serial data to enhance the data transmission rate.

6 Claims, 3 Drawing Sheets

APPARATUS FOR RECEIVING AND TRANSMITTING A SERIAL DATA

TECHNICAL FIELD

The present invention relates to a serial communication, and in particular, to an apparatus using compressed data transmission.

BACKGROUND ART

As illustrated in FIG. 1, conventional serial data receiving apparatus includes a receiving FIFO memory 2 coupled to a receiving hold register 1 and an address generating unit 3. The data receiving hold register 1 receives a serial data transmitted from a remote host, and stores a serial data up to a trigger level in accordance with a mode control signal (MCS). The register 1 outputs an interruptive signal to a host when a serial data reaches a certain trigger level. The first-in-first-out (FIFO) memory 2 stores a serial data transmitted thereto from the remote host in accordance with a mode control signal (MCS), and FIFOs a data during a data output. An address generator 3 designates an address of the data receiving FIFO memory 2 in accordance with a control signal (CS).

A conventional serial data transmitting apparatus is illustrated in FIG. 2. A data transmitting hold register 11 stores a parallel data up to a trigger level in accordance with a mode control signal (MCS) after receiving a parallel data from the host, and outputs an interruptive signal when the parallel data reaches a certain trigger level. A data transmitting FIFO memory 12 stores a parallel data transmitted from the host in accordance with the mode control signal, and FIFOs a data during a data output. An address generator 13 designates an address of the data transmitting FIFO memory 12 in accordance with a control signal (CS). A data transmitting shift register 14 reads a parallel data from the data transmitting FIFO memory 12 in accordance with an interruptive signal outputted from the data transmitting hold register 11, converts a parallel data into a serial data, and transmits the serial data.

When a FIFO mode is selected by a mode control signal (MCS) outputted from a FIFO control register (not illustrated) when receiving a serial data, the data receiving hold register 1 receives a serial data, composed of a start bit, a data bit, a parity bit, and a stop bit (see FIG. 3), from a remote host. Serial data is stored up to a trigger level, and the hold register 1 outputs an interruptive signal to the host when the serial data reaches a certain level.

The serial data receiving FIFO memory 2 receives a serial data transmitted from the remote host in accordance with a mode control signal outputted from the FIFO control memory (not illustrated), and stores a serial data in an address designated by an address generator 3. Therefore, in accordance with an interruptive signal outputted from the data receiving hold register 1, the host reads a parallel data stored in the data receiving FIFO memory 2 in a FIFO method.

When transmitting a serial data and a FIFO mode is selected by a mode control signal outputted from the FIFO control register when transmitting a serial data, the data transmitting hold register 11 receives 16 bytes of parallel data. The register 11 stores the parallel data up to a trigger level, and outputs an interruptive signal to a data transmitting shift register 14. The data transmitting FIFO memory 12 receives a parallel data transmitted from the host in accordance with a mode control signal outputted from the FIFO control register, and stores a parallel data in accordance with an address outputted from the address generator 13. After a data transmitting shift register 14 reads a parallel data from the data transmitting FIFO memory in accordance with an interruptive signal outputted from the transmitting hold register 11, the data transmitting shift register 14 converts the read parallel data into a serial data to transmit the parallel data to the host.

The conventional apparatus is disadvantageous. Since a conventional serial data transmitting and receiving apparatus transmits and receives a parallel data by converting a parallel data into a serial data, there has been a problem that the transmission rate of the apparatus thereof is much lower than that of a parallel communication for directly transmitting and receiving a parallel data.

DISCLOSURE OF THE INVENTION

The present invention is achieved at least in part by an apparatus for data communication, comprising: a first register for storing a serial data transmitted from a remote host up to a trigger level and for outputting an interruptive signal when the serial data is stored to a prescribed storage level; a FIFO memory for storing a serial data transmitted from the remote host, an address generator for designating an address of the FIFO memory in accordance with a control signal (CS); a repeating bit counter for reading prescribed bits of data of the FIFO memory and for counting a number of data read; and a second register for repeating and outputting the identical data when a count signal is outputted from the repeating bit counter during the outputting of a data of the FIFO memory.

The present invention is also achieved at least in part by an apparatus for data communication, comprising a data hold register for receiving a parallel data from a host, the data hold register stores the parallel data up to a trigger level, and outputs an interruptive signal when the parallel data is stored to a prescribed storage level, a first register for storing a parallel data transmitted from a host; a data comparing unit for comparing a previous parallel data with a present parallel data, a FIFO memory for receiving a parallel data from the first register and FIFOing the parallel data in accordance with a comparing signal from the data comparing unit; an address generator for designating an address of the FIFO memory in accordance with the comparing signal and a control signal of the data comparing unit; a second register for receiving a parallel data from the FIFO memory, the second register storing the data, and outputting the stored parallel data in accordance with the comparing signal of the data comparing unit; and a shift register for converting into a serial data the parallel data outputted from the second register in accordance with an interruptive signal outputted from the data hold register and for transmitting the data.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE FOR CARRYING OUT THE INVENTION

Figure 1:
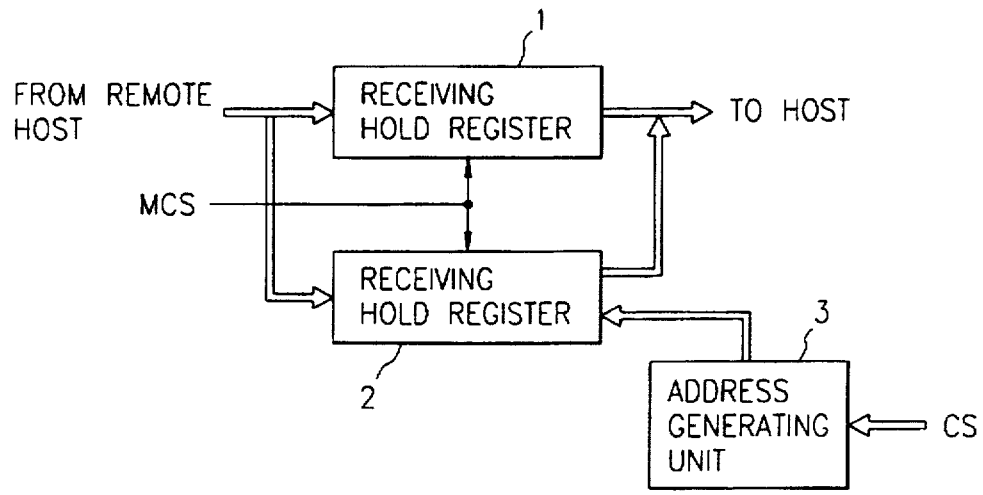
FIG. 1 is a block diagram of a conventional serial data receiving apparatus.
Figure 2:
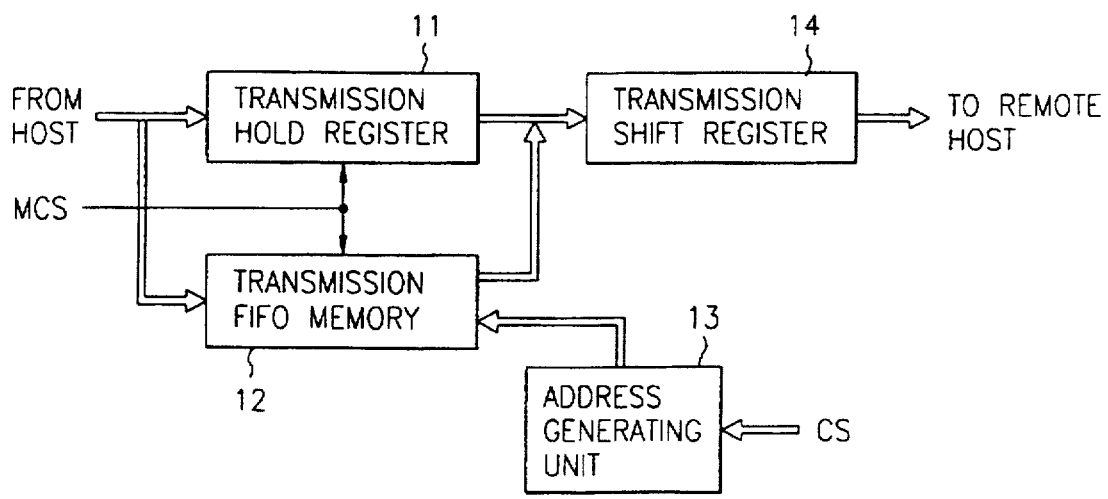
FIG. 2 is a block diagram of a conventional serial data transmitting apparatus.
Figure 3:
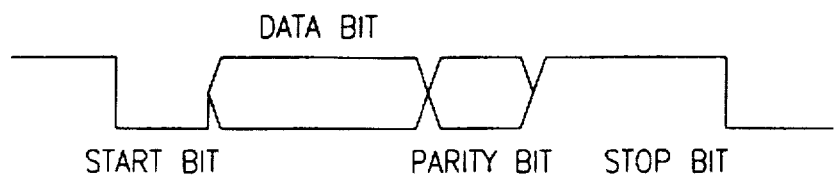
FIG. 3 is a view of an asynchronous serial data of FIG. 1.
Figure 4:
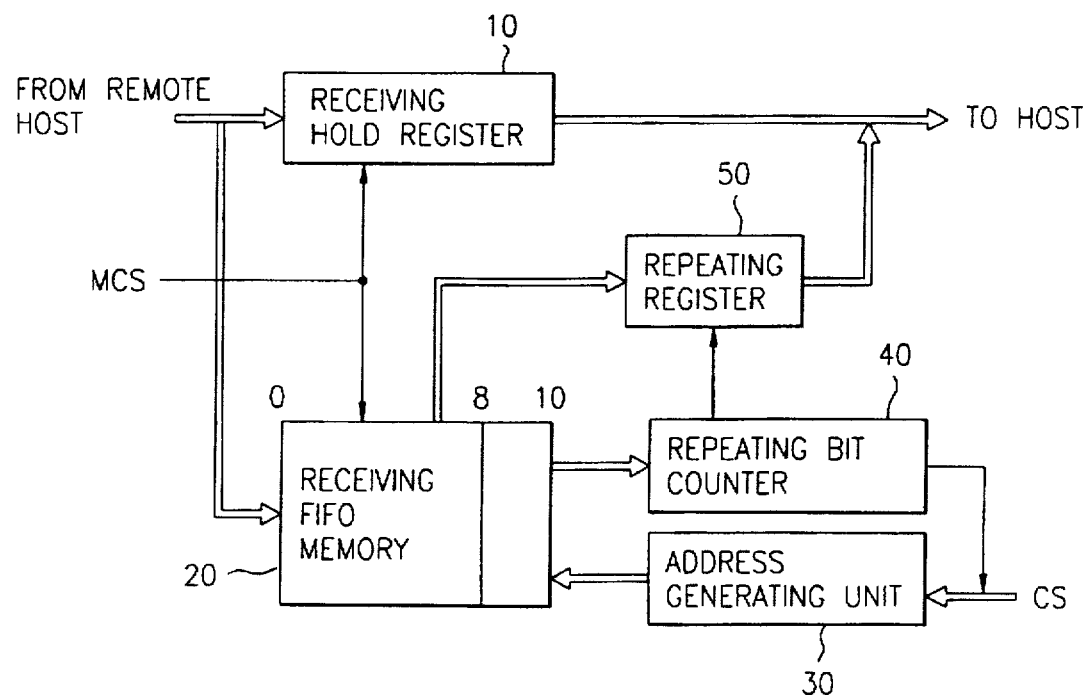
FIG. 4 is a block diagram of a serial data receiving apparatus according to the present invention.

As illustrated in FIG. 4, a data receiving apparatus according to the present invention includes a receiving FIFO memory 20 coupled to a receiving hold register 10, address generating unit 30, repeating bit counter 40 and a repeating register 50. The data receiving hold register 10 stores a serial data transmitted from a remote host up to a trigger level in accordance with a mode control signal (MCS) and outputs an interruptive signal when the serial data reaches a certain level. The data receiving FIFO memory 20 stores a serial data transmitted from the remote host in accordance with a mode control signal (MCS).

The address generating unit 30 designates an address of the data receiving. FIFO memory in accordance with a control signal (CS). The repeating bit counter 40 reads eight to ten bit data of the receiving FIFO memory and counts as many data as read. The repeating register 50 repeats and outputs an identical data when a count signal is outputted from the repeating bit counter during a data output of the receiving FIFO memory.

Figure 5:
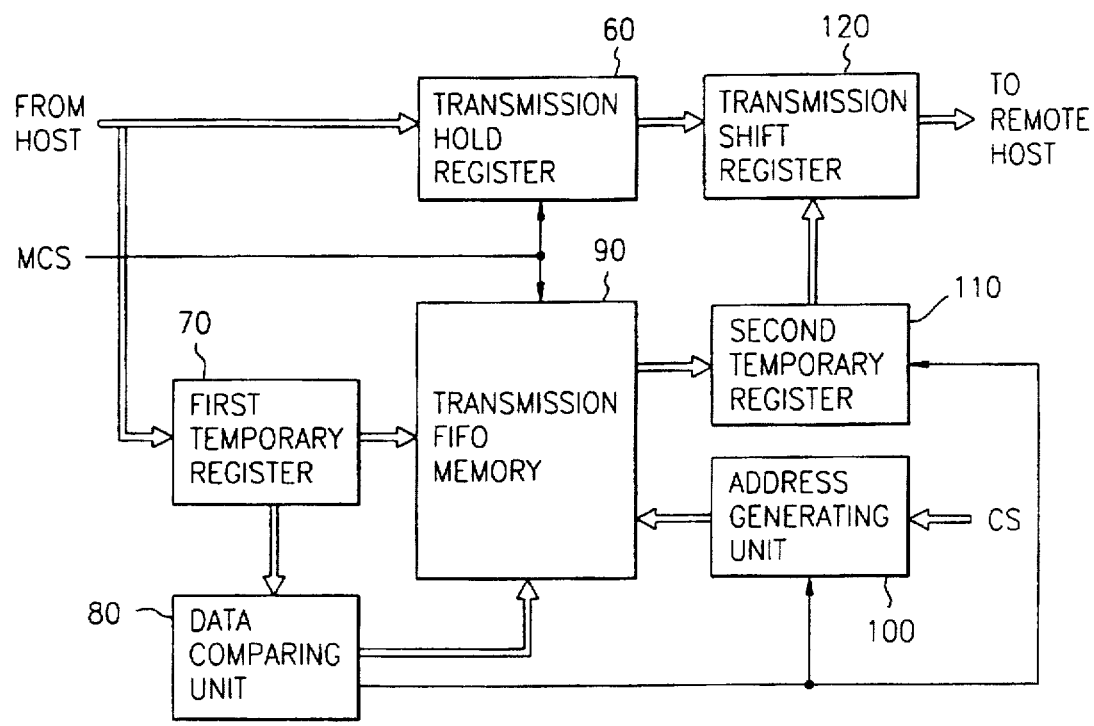
FIG. 5 is a block diagram of a serial data transmitting apparatus according to the present invention.

Referring to FIG. 5, a serial data transmitting apparatus according to the present invention includes a transmission FIFO memory 90 coupled to a first temporary register 70, data comparing unit 80, address generating unit 100, second temporary register 110 and transmission hold register 60. The transmission shift register 120 is coupled to the transmission hold register 60 and the second temporary register 110. The data transmitting hold register 60 stores a parallel data outputted from a host up to a trigger level in accordance with a mode control signal (MCS), and outputs an interruptive signal when the parallel data reaches a certain trigger level. The first temporary register 70 temporarily stores a parallel data transmitted from the host. The data comparing unit 80 receives sequentially a parallel data outputted from the first temporary register and compares a previous parallel data with the present parallel data.

The transmitting FIFO memory 90 receives a parallel data from the first temporary register and FIFOs the parallel data in accordance with a comparing signal of the data comparing unit. The address generator 100 designates a FIFO address of the transmitting FIFO memory in accordance with a comparing signal and a control signal (CS) of the data comparing unit. The second temporary register 110 stores a parallel data outputted from the transmitting FIFO memory and outputs the stored parallel signal in accordance with a comparing signal of the data comparing unit. The data transmitting shift register 120 converts a parallel data outputted from the second temporary register into a serial data in accordance with an interruptive signal outputted from the transmitting hold register, and transmits the serial data.

Figure 6:
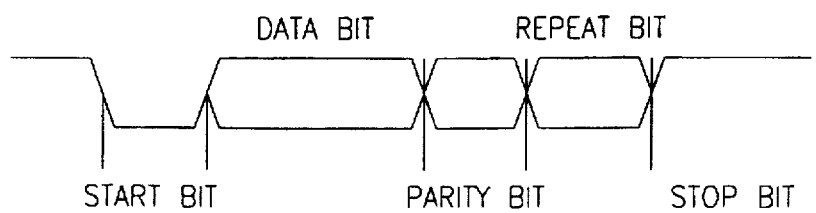
FIG. 6 is a view of an asynchronous serial data according to the present invention.

When a FIFO mode is selected by a mode control signal (MCS) outputted from the FIFO control register and the data receiving hold register receives a serial data, the receiving hold register 10 and the receiving FIFO memory 20 start operating. The data receiving FIFO memory includes sixteen 11-bit memories. As shown in FIG. 6, the data receiving hold register 10 receives from a remote host a serial data composed of a start bit, a data bit, a parity bit, a repeating bit, and a stop bit. The receiving hold register 10 stores the serial data up to a trigger level, and outputs an interruptive signal to the host when the serial data reaches a certain level. The data receiving FIFO memory 20 receives a serial data transmitted from the remote host in accordance with the mode control signal (MCS) and sequentially stores the transmitted serial data in a corresponding address which is designated by an address generator 3. Hence, a repeating register 50 receives a data outputted from the data receiving FIFO memory 20 and outputs the data to the host.

The repeating bit counter 40 reads eight (8) to ten (10) bit data among the 11-bit data of the data receiving FIFO memory 20, and counts as much data value as read. The bit counter 40 outputs the data value to the repeating register 50, which outputs an identical data to the host in accordance with a count signal of the repeating bit counter 40. When the data value read from 8-bit through 10-bit of the data receiving FIFO memory 20 is 7 (in a form of decimal number), the repeating bit counter 40 counts seven times, and the address generator 30 locates zero (0) byte of the data receiving FIFO memory 20. The repeating register 50 outputs an identical data to the host during the seven counting operations of the repeating bit counter 40.

After the seven counting operations, the repeating bit counter controls an operation that the address generator 30 locates one byte of the data receiving FIFO memory 20. The repeating register 50 normally outputs the data outputted from the data receiving FIFO memory to the host.

When the FIFO mode is selected by a mode control signal (MCS) outputted from a FIFO control register for transmitting a data, the data transmitting hold register 60 receives a parallel data from the host, stores a parallel data up to a trigger level, and outputs an interruptive signal to the host when the parallel data reaches a certain level. After the parallel data, which is transmitted from the host through the first temporary register 70, is inputted to the transmission FIFO memory 90, and is stored therein in accordance with an address designated by the address generator 100, the parallel data passes through the second temporary register 110, and is outputted to the data transmitting shift register 120. The shift register 120 converts a parallel data inputted thereto from the second temporary register 110 in accordance with an interruptive signal outputted from the data transmitting hold register 60 into a serial data, as illustrated in FIG. 6.

The data comparing unit 80 receives a parallel data outputted from the host through the first temporary register 70, compares the previous parallel data with the present parallel data, and outputs a comparing signal respectively to the data transmitting FIFO memory 90, the address generator 100, and the second temporary register 110. When the data are identical to each other after the comparison of the data, the address generator 100 generates an identical address in accordance with a comparing signal of the data comparing unit 80, so that the transmitting FIFO memory 90 stores the number (maximum 7) of the identical data in the eighth to tenth bits of the data receiving FIFO memory. In case the identical number of a parallel data continues to be outputted from the data transmitting FIFO memory in accordance with a comparing signal, the second temporary register holds the parallel data until the repetition of the identical number of a parallel data is finished, and transmits the held data to the remote host through the data transmitting shift register when a different number data is inputted.

As described above, the present invention can enhance the data transmission rate, and can be used with a great effectiveness when the present invention is adapted to a modem, or other serial communication systems, by compressing and transmitting a serial data during a transmission of a serial data.

The foregoing embodiment is merely exemplary and not to be construed as limiting the present invention. The present scheme can be readily applied to other types of communication apparatus. The description of the present invention is intended to be illustrative, and not limiting the scope of the claims. Many alternatives, modifications and variations will be apparent to those skilled in the art.

I claim:

1. An apparatus for data communication, comprising:

a first register for storing a serial data transmitted from a remote host up to a trigger level and for outputting an interruptive signal when the serial data is stored to a prescribed storage level;

a FIFO memory for storing a serial data transmitted from said remote host;

an address generator for designating an address of said FIFO memory in accordance with a control signal;

a repeating bit counter for reading prescribed bits of data of said FIFO memory and for counting a number of data read; and a second register for repeating and outputting the identical data when a count signal is outputted from said repeating bit counter during the outputting of a data of said FIFO memory.

2. The apparatus of claim 1, wherein said prescribed bits of data are bits eight to ten.

3. An apparatus for data communication, comprising:

a data hold register for receiving a parallel data from a host, said data hold register stores the parallel data up to a trigger level, and outputs an interruptive signal when the parallel data is stored to a prescribed storage level;

a first register for storing a parallel data transmitted from a host;

a data comparing unit for comparing a previous parallel data with a present parallel data;

a FIFO memory for receiving a parallel data from said first register and FIFOing the parallel data in accordance with a comparing signal from said data comparing unit;

an address generator for designating an address of said FIFO memory in accordance with the comparing signal FIFO memory and a control signal of said data comparing unit;

a second register for receiving a parallel data from said FIFO memory, said second register storing the data, and outputting the stored parallel data in accordance with the comparing signal of the data comparing unit; and a shift register for converting into a serial data the parallel data outputted from the second register in accordance with an interruptive signal outputted from said data hold register and for transmitting the data.

4. The apparatus of claim 3, wherein when an identical number of the parallel data continues to be outputted from the transmitting FIFO memory in accordance with the comparing signal, said second register holds the data until the repetition of the identical parallel data is finished.

5. The apparatus of claim 3, wherein said serial data includes a start bit, a data bit, a parity bit, a repeating bit, and a stop bit.

6. The apparatus of claim 3, further comprising a repeating bit counter controlling an address generator continuously in a level of a zero byte in the FIFO memory during the counting operation, and the repeating bit counter makes the address generator in a level of a 1 byte in the FIFO memory after the counting operation is finished.

* * * * *